United States Patent
Packwood et al.

(10) Patent No.: US 10,861,187 B2
(45) Date of Patent: Dec. 8, 2020

(54) METHOD OF PROCESSING OBJECT DETECTION DATA

(71) Applicant: Apical Limited, Cambridge (GB)

(72) Inventors: David Packwood, Cambridge (GB); Vladislav Terekhov, Cambridge (GB)

(73) Assignee: Apical Limited, Cambridge (GB)

( * ) Notice: Subject to any disclaimer, the term of this patent is extended or adjusted under 35 U.S.C. 154(b) by 60 days.

(21) Appl. No.: 16/275,166

(22) Filed: Feb. 13, 2019

(65) Prior Publication Data
US 2020/0258254 A1 Aug. 13, 2020

(51) Int. Cl.
| | | |
|---|---|---|
| *G06K 9/00* | (2006.01) | |
| *G06T 7/73* | (2017.01) | |
| *G06T 7/77* | (2017.01) | |
| *G06T 11/60* | (2006.01) | |
| *G06T 7/187* | (2017.01) | |
| *G06T 7/11* | (2017.01) | |

(52) U.S. Cl.
CPC ............... *G06T 7/75* (2017.01); *G06T 7/11* (2017.01); *G06T 7/187* (2017.01); *G06T 7/77* (2017.01); *G06T 11/60* (2013.01); *G06T 2207/20081* (2013.01); *G06T 2207/20104* (2013.01)

(58) Field of Classification Search
CPC ........... G06T 7/246; G06T 7/292; G06T 7/73; G06T 13/20; G06T 7/2046; G06T 7/75; G06T 7/187; G06T 7/11; G06T 7/77; G06T 11/60; G06K 9/00342; G06K 9/00718; G06K 9/00771; G06K 9/4642; G06K 9/6212; G06K 9/6218
See application file for complete search history.

(56) References Cited

U.S. PATENT DOCUMENTS

| | | | | |
|---|---|---|---|---|
| 2016/0048741 A1* | 2/2016 | Nguyen | ............ | G06K 9/00624 382/159 |
| 2017/0249766 A1* | 8/2017 | Namiki | ................ | G06K 9/6255 |
| 2017/0293800 A1* | 10/2017 | Babenko | .............. | G06K 9/6255 |
| 2017/0337692 A1* | 11/2017 | Romanenko | ....... | G06K 9/00201 |
| 2018/0025249 A1* | 1/2018 | Liu | .......................... | G06N 3/04 382/158 |

* cited by examiner

*Primary Examiner* — Duy M Dang
(74) *Attorney, Agent, or Firm* — EIP US LLP (57) ABSTRACT

There is provided a computer-implemented method of processing object detection data. The method includes receiving, from an object detection system, object detection data comprising a plurality of detection outputs associated with different respective regions of an image, wherein a first detection output of the plurality of detection outputs is associated with a first region of the image and comprises a plurality of received detection characteristics. The method includes processing the first detection output to determine one or more modified detection characteristics of said plurality of received detection characteristics. Processing the first detection output includes retrieving a mapping function and applying the mapping function, where the mapping is dependent upon at least one of the plurality of received detection characteristics.

14 Claims, 9 Drawing Sheets

METHOD OF PROCESSING OBJECT DETECTION DATA

BACKGROUND OF THE INVENTION

Field of the Invention

The present invention relates to a method of modifying data generated by an object detection system.

Description of the Related Technology

Object detection systems are configured to determine whether objects of one or more predetermined classes are present in an image, and if so, the dimensions and locations of the objects in the image. A generic object detection system uses a detection mesh including multiple detection anchors, also referred to as detection receptors, which are responsible for detecting objects associated with different respective regions of an image. When an image is processed by the object detection system, each detection anchor generates output data indicative of one or more detection characteristics, for example a detection score associated with a detection of an object, an estimated location of the object, estimated dimensions of the object, and a predicted class of the object.

Object detection is most effective in cases where an object is entirely contained within an image, and where the dimensions and location of the object substantially correspond to those of a detection anchor. Performance of the object detection system may be degraded in cases where the object extends outside of a border of the image, or where the dimensions and/or location of the object do not substantially correspond to those of a detection anchor. In certain examples, degraded performance may be manifested as a reduced or otherwise erroneous detection score, or inaccurate estimations of an object's location and/or dimensions. In cases where the object detection system receives image data from an associated image capture system, the performance of the object detection system may be further degraded due to defects introduced by the image capture system.

In order to mitigate against degraded performance of an object detection system resulting from the effects described above, it is possible to replace the detection mesh with a finer detection mesh with a higher density of detection anchors. Increasing the density of detection anchors generally increases the computational cost of performing object detection. Furthermore, in many cases replacing the detection mesh requires the object detection system to be retrained from scratch.

SUMMARY

According to a first aspect, there is provided computer-implemented method of modifying data generated by an object detection system. The method includes receiving, from an object detection system, object detection data comprising a plurality of detection outputs associated with different respective regions of an image, wherein a first detection output of the plurality of detection outputs is associated with a first region of the image and comprises a plurality of received detection characteristics. The method includes processing the first detection output to determine one or more modified detection characteristics of said plurality of received detection characteristics. Processing the first detection output includes retrieving a mapping function and applying the mapping function, the mapping being dependent upon at least one of the received detection characteristics.

According to a second aspect, there is provided a method of calibrating a system for modifying data generated by an object detection system. The method includes receiving a calibration image comprising a first object with predetermined object characteristics, and processing the calibration image, using the object detection system, to generate a plurality of detection outputs associated with different respective regions of the calibration image and each comprising a respective plurality of detection characteristics. The method includes associating the plurality of detection outputs with the predetermined object characteristics to generate a labeled plurality of detection outputs, and processing the labeled plurality of detection outputs using supervised learning to generate a mapping function. The mapping function is configured to process one or more received detection characteristics to determine one or more modified detection characteristics, the mapping being dependent upon at least one of the one or more received detection characteristics.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Embodiments of this application relate to methods of modifying data generated by an object detection system. Object detection systems typically process an image using a set of detection anchors or detection receptors corresponding to different respective regions of the image. Each detection anchor may generate a detection output including one or more detection characteristics. Examples of detection characteristics include an estimated detection score associated with a detection of an object, an estimated location of a detected object, and estimated dimensions of a detected object. Depending on the specific object detection method implemented by an object detection system, the regions associated with a set of detection anchors may be mutually overlapping or non-overlapping, and may have various scales and aspect ratios. The set of detection anchors results in a detection mesh, which may be regular or irregular, depending on the locations and dimensions of the detection anchors.

Figure 1:
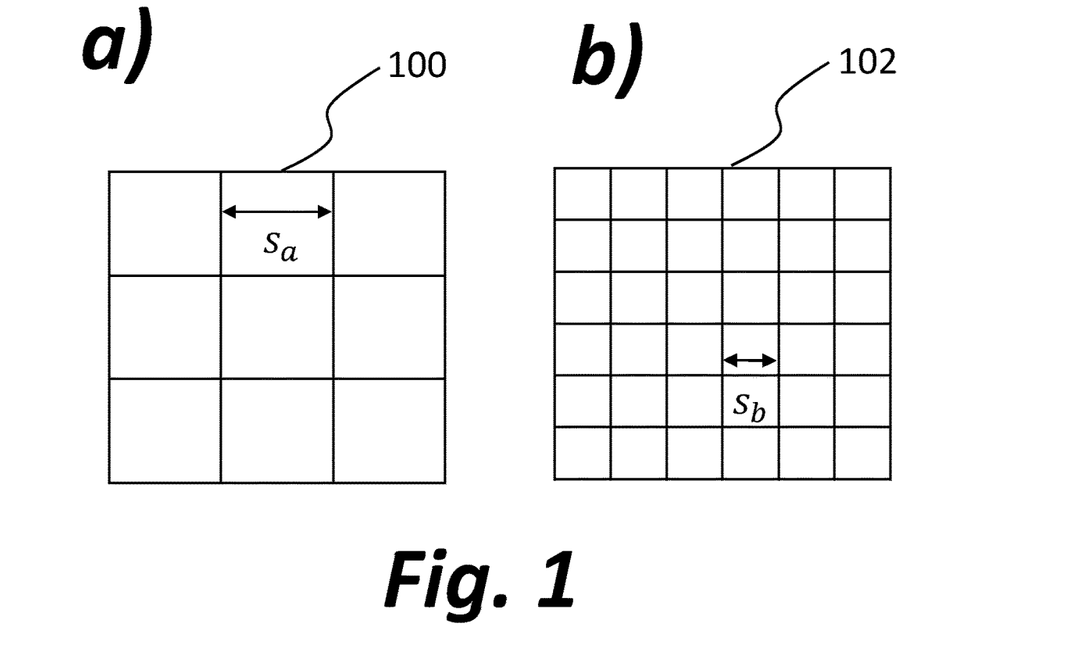
FIG. 1 shows an example of a detection mesh used by an object detection system.

As illustrated by FIG. 1, a detection mesh may be formed of one or more component meshes, each responsible for detecting objects at a corresponding respective scale within an image. FIG. 1a shows a regular 3×3 component mesh 100 formed of equally sized, non-overlapping square regions with sides of length $s_a$ (measured in pixels), such that each square region is arranged to include $s_a \times s_a$ pixels when applied to an image. In this example, the horizontal and vertical separations of adjacent squares, referred to respectively as the horizontal and vertical strides, are equal to the length $s_a$ of the sides of the square regions. FIG. 1b shows a regular 6×6 component mesh 102 formed of equally sized non-overlapping square regions with size $s_b$. The horizontal and vertical strides are equal to the length $s_b$ of the sides of the square regions. In an example, an object detection system associates each of the squares of lengths $s_a$ and $s_b$ with a respective detection anchor, resulting in a regular, two-scale detection mesh. In other examples, a detection mesh may be formed of more or fewer than two component meshes. In some examples, a horizontal and/or vertical stride may be smaller than a size of a region corresponding to a detection anchor, resulting in a detection mesh comprising overlapping regions at each of one or more scales. For example, an object detection system implementing sliding windows detection may use a multi-scale detection mesh including a regular component mesh at each scale, each component mesh having a vertical and horizontal stride of one or a few pixels.

Figure 2:
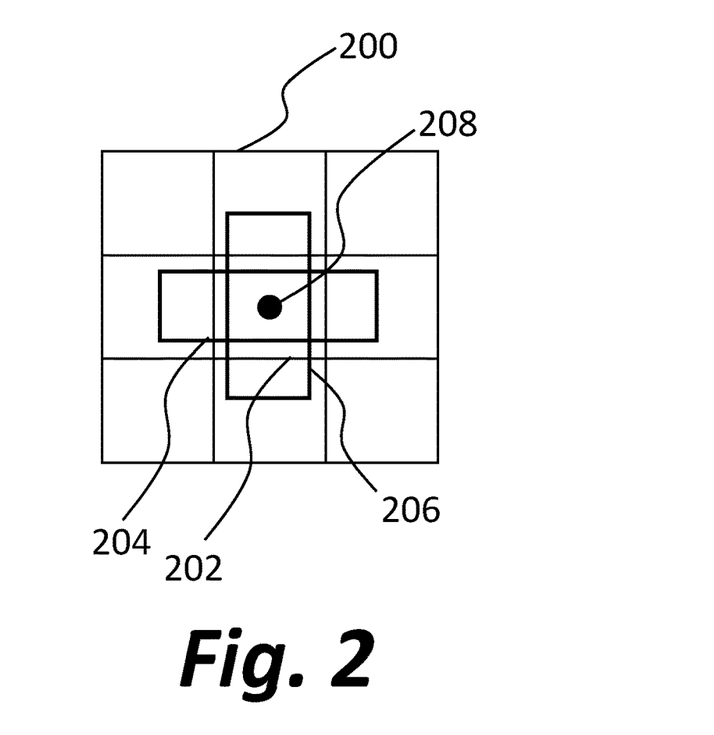
FIG. 2 shows examples of detection anchors used by an object detection system.

In some examples, a detection mesh may include multiple component meshes at each of one or more scales, each component mesh being formed of rectangles with different dimensions. FIG. 2a shows an example of a regular 3×3 grid 200 identical to the component mesh 100 of FIG. 1a. In this example, a central square region 202 is assigned two detection anchors 204 and 206. The detection anchors 204 and 206 are both centered at a point 208 within the central square region 202, but have different aspect ratios. Detection anchor 204 has a greater width than height, and detection anchor 206 has a greater height than width. The remaining eight square regions of the grid 200 are each assigned two detection anchors with dimensions corresponding to those of detection anchors 204 and 206, resulting in a component mesh of rectangles for each of the two aspect ratios. In other examples, a detection mesh may be formed of more than two component meshes corresponding to detection anchors with more than two different respective dimensions. In some examples, the dimensions of the detection anchors are predetermined. In other examples, the aspect ratios of the detection anchors are learned from a set of training data, for example using an unsupervised learning algorithm such as K-means clustering.

It is stressed that the detection meshes described above with reference to FIGS. 1 and 2 are examples only, and a given object detection system may use a different configuration of detection anchors. For example, an object detection system may use a multi-scale detection mesh with several component meshes at each scale, corresponding to detection anchors with different aspect ratios. In a further example, an object detection system may use a detection mesh formed of one or more irregular component meshes.

Figure 3:
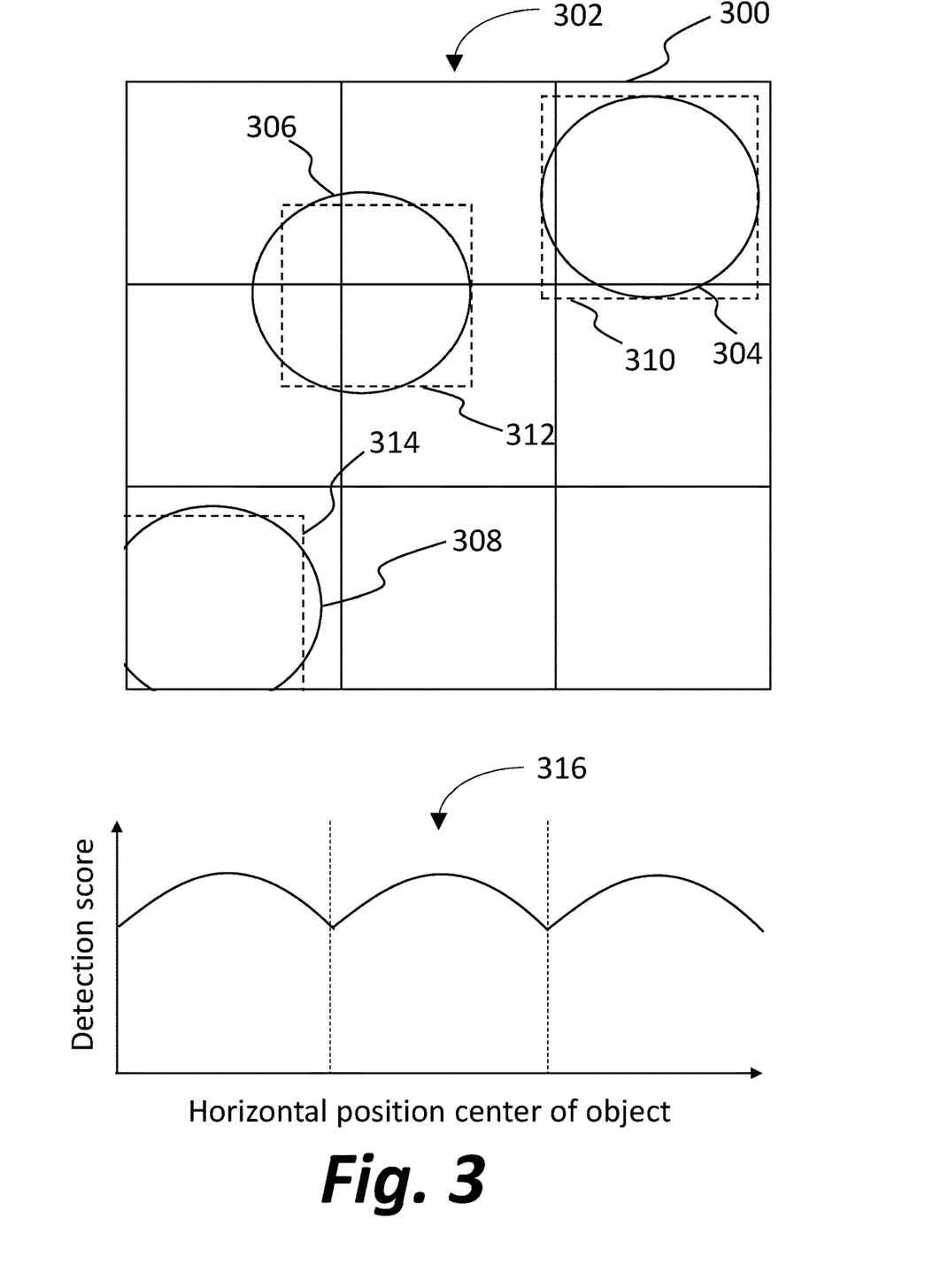
FIG. 3 shows an example of a detection mesh being used to detect objects at various locations within an image.

FIG. 3 shows an example of a regular 3×3 detection mesh 300 overlaid onto an image 302. The detection mesh 300 includes nine equally sized square detection anchors. In this example, the detection mesh 300 is used by an object detection system that has been trained to detect circular objects that approximately correspond in size to the detection anchors of the detection mesh 300. The image 302 includes or partially includes three circles 304, 306, and 308. The circle 304 is substantially aligned with a detection anchor in the upper-right corner of the detection mesh 300. The circle 306 is spread across four detection anchors, and the circle 308 is partially contained within a detection anchor in the bottom-left corner of the detection mesh 300, but extends outside of a border of the image 302.

In the example of FIG. 3, the object detection system generates, for each detection anchor, a detection output including detection characteristics. In this example, the detection characteristics include a detection score associated with a detection of a circular object, an estimated location with respect to the detection anchor of a bounding box, and estimated dimensions of the bounding box. A detection score is a number that is indicative of whether a detection anchor has detected an object. Different object detection methods define detection scores in different ways. For example, the You Only Look Once algorithm (YOLO) defines a confidence score, indicative of whether the detection anchor has detected an object belonging to any of a set of predetermined classes. A further class probability score is then defined for each of the predetermined class, indicative of whether an object, if detected, belongs to that class. By contrast, the Single Shot Detector (SSD) algorithm defines a class score for each of a set of predetermined classes, including a generic "background" class, which is expected to be high when no object of any of the other predetermined classes is present.

As mentioned above, in the example of FIG. 3, each detection anchor outputs detection characteristics including a detection score and an estimated location and dimensions of a bounding box. In the present example, the estimated location is an estimated center of the bounding box, though in other examples an estimated location may be, for example, an estimated corner of a bounding box. The estimated dimensions include the width and height of the bounding box. In this example, the detection anchor in the upper-right corner of the detection mesh 300 outputs an estimated location and estimated dimensions of a bounding box 310. Because the circle 304 is substantially aligned with the detection anchor in the upper-right corner, it is observed that the estimated location and dimensions of the bounding box 310 closely correspond to the location and dimensions of the circle 304. Furthermore, the detection score output by the detection anchor in the upper-right corner is high, implying a high likelihood of an object being detected by that detection anchor. The detection anchor in the center of the detection mesh 300 outputs an estimated location and estimated dimensions of a bounding box 312. In this case, the circle 306 is mostly contained within the detection anchor in the center of the detection mesh 300, but is not substantially aligned with that detection anchor (the circle 306 is offset from the central detection anchor in both the horizontal and vertical directions). It is observed that the estimated location and dimensions of the bounding box 312 are less accurate than those of the bounding box 310. Furthermore, the detection score output by the central detection anchor is lower than that output by the upper-right detection anchor. The reason for this is that the performance of an object detection system is generally degraded where the location of an object to be detected does not closely correspond to those of a detection anchor. The degraded performance may be manifested as a reduction in accuracy of detection characteristics (for example, the estimated location and/or dimensions of a bounding box) or a reduced or otherwise erroneous detection score. The exact nature of the degradation of performance depends on the object detection method and the specific detection mesh used by an object detection system.

The detection anchor in the bottom-left corner of the detection grid 300 outputs an estimated location and dimensions of a bounding box 314. In this case, the circle 308 extends outside of a border of the image 302. It is observed that the estimated location and dimensions of the bounding box 314 are less accurate than those of the bounding box 310. Furthermore, the detection score output by the bottom-left detection anchor is lower than that output by the upper-right detection anchor. The reason for this is that the performance of an object detection system is generally degraded where an object to be detected is not completely contained within an image. In other examples, boundary defects resulting from an object being close to or extending beyond a border of an image may result in other forms of erroneous detection characteristics, for example incorrect class predictions.

The graph 316 shown in FIG. 3 illustrates the variation of a detection score associated with a detection of an object by an object detections system using the detection mesh 300, as the object is moved horizontally across the detection mesh 300. The object has dimensions substantially corresponding to those of the detection anchors of the detection mesh 300. It is observed that the detection score is highest when the location of the center of the object closely corresponds to the location of the center of a detection anchor, and is lowest when the location of the center is halfway between the centers of two detection anchors.

Figure 4:
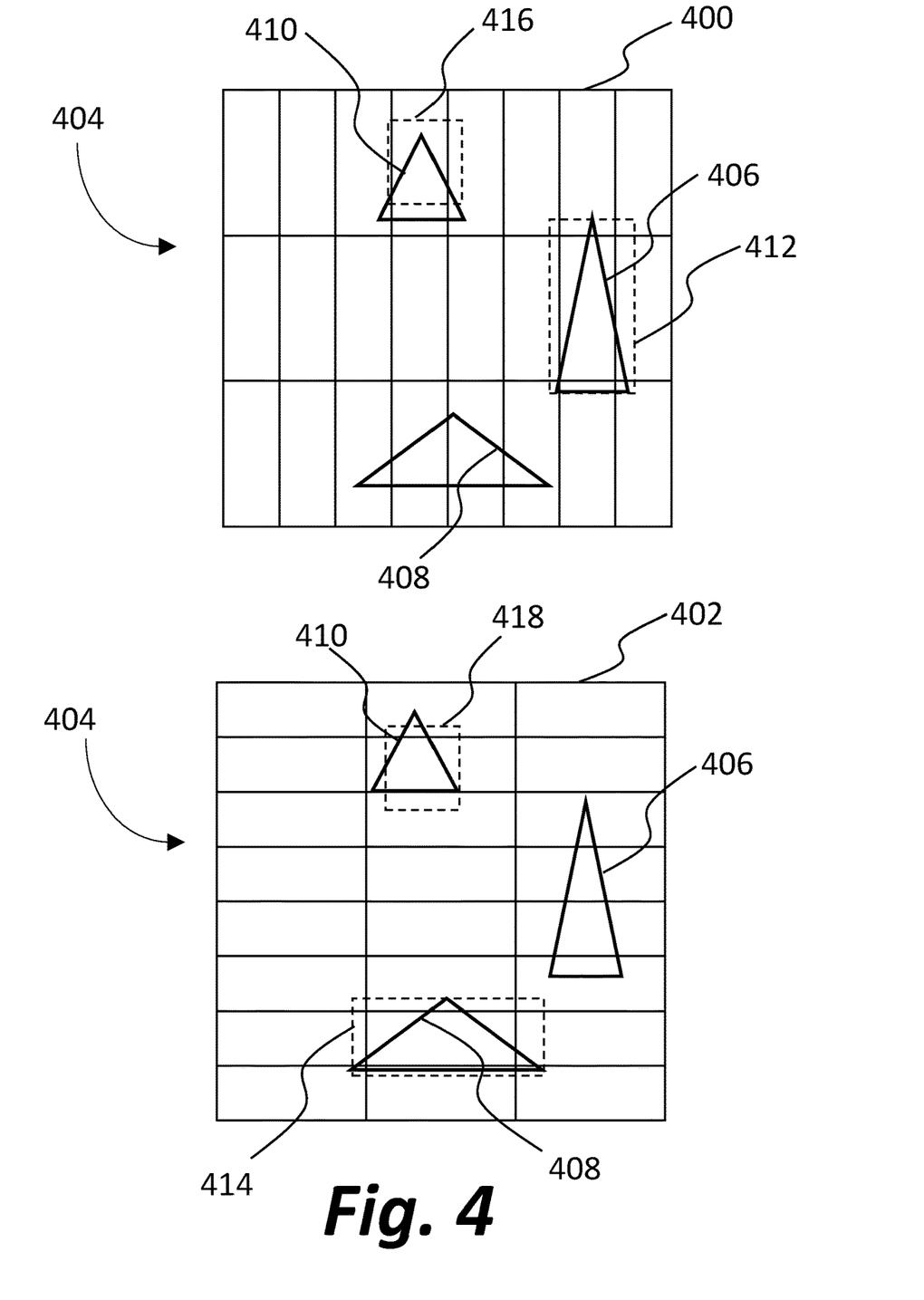
FIG. 4 shows an example of a detection mesh being used to detect objects of various dimensions within an image.

FIG. 4 shows an example of two component meshes 400 and 402 each overlaid onto an image 404. The component meshes 400 and 402 each include 24 non-overlapping rectangular detection anchors, but the respective aspect ratio of the detection anchors in component mesh 400 are different to the respective aspect ratios for component mesh 402. It is noted that in other examples, detection anchors within a component mesh may overlap. The component meshes 400 and 402 are drawn as having non-overlapping detection anchors for the sake of clarity. In this example, a detection mesh composed of the component mesh 400 and the component mesh 402 is used by an object detection system that has been trained to detect triangular objects. The image 404 includes three triangles 406, 408, and 410 having different respective dimensions. The triangle 406 has dimensions that closely correspond to those of the detection anchors of component mesh 400. The triangle 408 has dimensions that closely correspond to those of the detection anchors of component mesh 402. The triangle 410 has dimensions that do not closely correspond to either of the component meshes 400 or 402.

In the example of FIG. 4, each detection anchor outputs detection characteristics including a detection score and an estimated location and dimensions of a bounding box. In this example, the detection anchor second from the right in the middle row of the component mesh 400 outputs an estimated location and estimated dimensions of a bounding box 412. Because the triangle 406 has dimensions that closely correspond to those of a detection anchor, it is observed that the estimated location and dimensions of the bounding box 412 closely correspond to the location and dimensions of the triangle 406. Furthermore, the detection score output by the detection anchor second from the right in the middle row of the component mesh 400 is high, implying a high likelihood of an object being detected by that detection anchor. The detection anchor second from the bottom in the middle column of the component mesh 402 outputs an estimated location and estimated dimensions of a bounding box 414. Because the triangle 408 has dimensions that closely correspond to those of a detection anchor, it is observed that the estimated location and dimensions of the bounding box 414 closely correspond to the location and dimensions of the triangle 408. Furthermore, the detection score output by the detection anchor second from the bottom in the middle column of the component mesh 402 is high, implying a high likelihood of an object being detected by that detection anchor. The detection anchor fourth from the left in the top row of the component mesh 400 outputs an estimated location and estimated dimensions of a bounding box 410. Because the triangle 410 has dimensions that do not closely correspond to those of a detection anchor, it is observed that the estimated location and dimensions of the bounding box 416 are less accurate than those of bounding boxes 412 and 414. Furthermore, the detection score output by the detection anchor fourth from the left in the top column of the component mesh 400 is relatively low. In this example, the detection anchor second from the top of the middle column of the component mesh 402 outputs detection characteristics indicative of a bounding box 418. However, the detection score associated with bounding box 418 is lower than the detection score associated with bounding box 416. Since the bounding boxes 416 and 418 are largely overlapping (as measured, for example, by the intersection over union of the two bounding boxes), the object detection system in the present example disregards the bounding box 418, and the bounding box 416 and associated detection score are used for the detection of the triangle 410. The step of disregarding certain bounding boxes in this way is referred to as non-maximum suppression.

The reason for the estimated dimensions and location of the bounding box 416 being less accurate than those of the bounding boxes 412 and 414 is that the performance of an object detection system is generally degraded where the dimensions of an object to be detected does not closely correspond to those of a detection anchor. The degraded performance may be manifested as a reduction in accuracy of detection characteristics (for example, the estimated location and/or dimensions of a bounding box) or a reduced or otherwise erroneous detection score. The exact nature of the degradation of performance depends on the object detection method and the specific detection mesh used by an object detection system. The degraded performance of the object detection system for an object at a locations and/or having dimensions not corresponding closely to a detection anchor is referred to as an inter-mesh defect.

Figure 5:
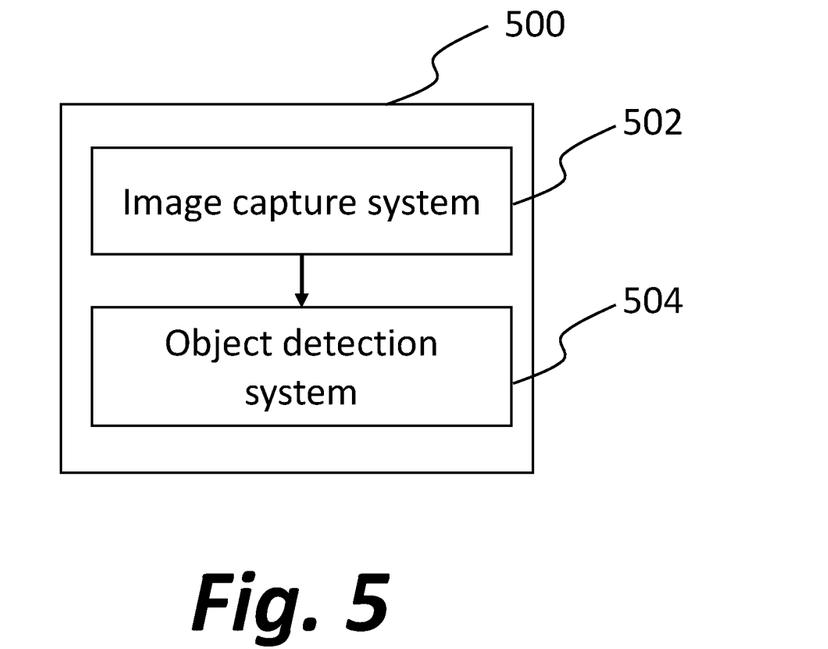
FIG. 5 shows schematically an example of a system for detecting objects in an environment.

FIG. 5 shows an example of a system 500 for detecting objects in an environment. The system 500 may be used, for example, by an autonomous vehicle to detect (and classify) objects in a region extending in front of the autonomous vehicle. The system 500 includes an image capture system 502 and an object detection system 504. The image capture system 502 in this example includes an aperture through which light (or other radiation, such as infra-red radiation) may pass, one or more lenses, and an image sensor for converting light or other radiation into a digital image. It will be appreciated that different image capture systems may have additional or different components to the image capture system 502, depending on the relevant requirements and/or constraints imposed on the image capture system. The object detection system 504 receives image data from the image capture system 502 and processes the image data by implementing an object detection method using a detection mesh as described above. The image data may comprise pixel values corresponding to one or more color channels for each of a predetermined number of pixels. In a specific example, an image includes 224×224 pixels, each having intensity values for each of three color channels (Red, Green, and Blue), though it will be appreciated that the systems and methods described herein are equally applicable to other formats of image data. In the example of FIG. 5, the image capture system 502 is provided by an image capture system manufacturer, and the object detection system (including machine-readable code executed by the object detection system to perform an object detection method) is designed for use within a range of image capture systems, possibly manufactured by a range of manufacturers.

Figure 6:
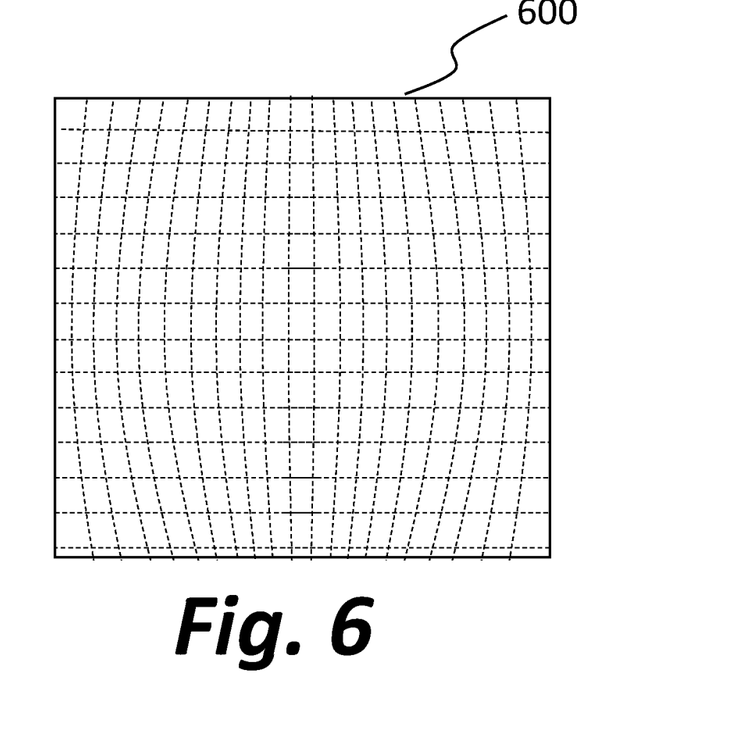
FIG. 6 shows an example of an image formed by an image capture system.

Depending on the properties of the image capture system 502, an image received by the object detection system 504 may correspond to a stretched, deformed, or otherwise distorted view of the environment from which the image is captured. This distortion may be caused, for example, by the one or more lenses of the image capture system 504. FIG. 6 shows an example of an image 600 generated by the image capture system 502. The dashed curves in this example correspond to straight lines in the environment, and accordingly the relative locations, dimensions, and shapes of objects in the environment may be distorted by the image capture system 504. If the object detection system 504 subsequently processes the image 600 by performing an object detection method, the distortion introduced by the image capture 502 has an equivalent effect to a distortion of the detection mesh used by the object detection system, and the detection characteristics output by the object detection system will be affected accordingly. As a result, a detection score, an estimated location, and/or estimated dimensions associated with a detection of an object will be affected. In an example where the system 500 is used by an autonomous vehicle to determine the locations of objects of certain classes in an environment, the result of a location of an object being determined incorrectly could have undesired and potentially dangerous consequences.

Figure 7:
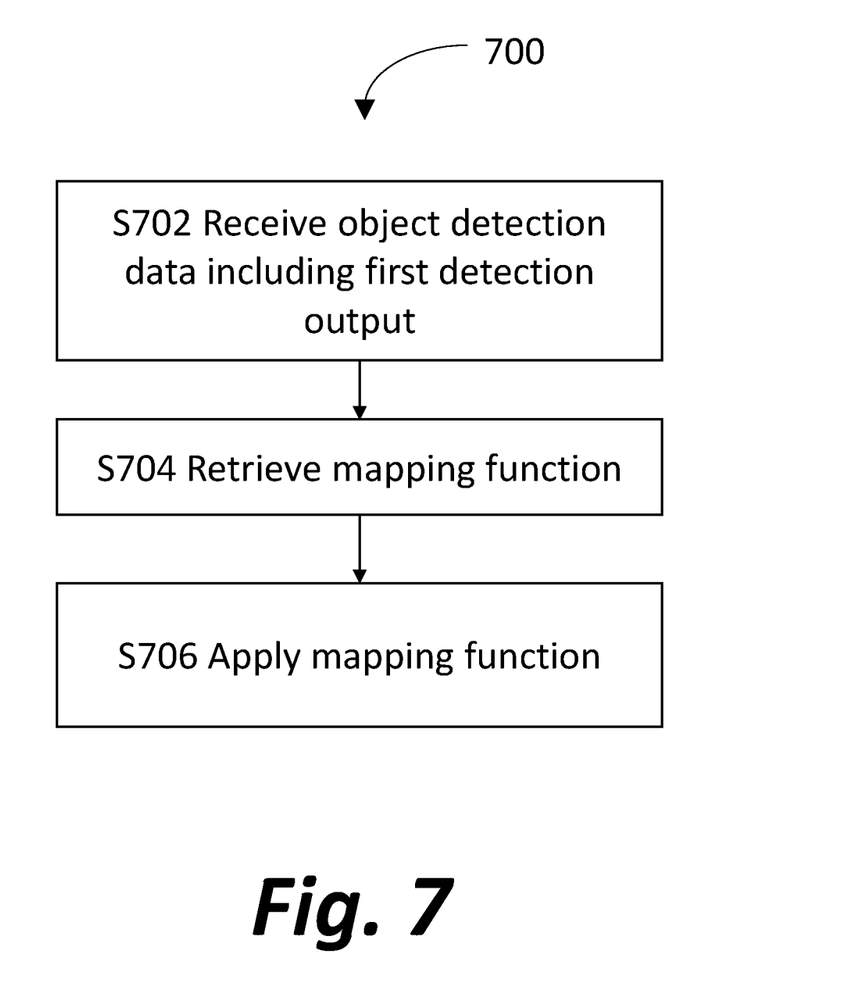
FIG. 7 is a flow diagram representing a method for modifying an output of an object detection system.

FIG. 7 shows an example of a computer-implemented method 700 for modifying data generated by an object detection system in accordance with an embodiment of the present invention. The method 700 includes receiving, at S702, object detection data from an object detection system. The object detection data includes multiple detection outputs generated by different respective detection anchors, each corresponding to a different respective region of an image and comprising a set of received detection characteristics. In an example, the received detection characteristics generated by a detection anchor include a detection score indicative of a detection of an object in the image, and data indicative of an estimated location and/or estimated dimensions of an object, for example an estimated location of a bounding box relative to the detection anchor, and estimated dimensions of the bounding box. In other examples, received detection characteristics may include other data indicative of an estimated location and/or estimated dimensions of an object, for example estimated co-ordinates of key points associated with a particular type of object (such as the locations of eyes, if the object detection system is configured to detect human faces). The received detection characteristics may further include data indicative of class probabilities relating to a set of predefined object classes that the object detection system is configured to detect. As discussed above, a detection score may be a confidence score indicative of whether the detection anchor has detected an object belonging to any of a set of predetermined classes, or may be a class score indicative of whether the detection anchor has detected an object belonging to a specific predetermined class.

The method 700 includes processing the first detection output to determine one or more modified detection characteristics of the set of detection characteristics. In some examples, the modified detection characteristics include a modified detection score. In some examples, the modified detection characteristics include a modified estimated location and/or modified estimated dimensions of a bounding box. Processing the first detection output to determine the one of more modified detection characteristics includes retrieving, at S704, a mapping function configured to compensate for degraded performance of the object detection system resulting from inter-mesh defects, boundary defects, and/or mesh deformation defects, as described in detail above. The mapping is dependent upon at least one of the received detection characteristics. In some examples, the mapping is dependent on an estimated location of an object relative to the first region of the image. For example, if an inter-mesh defect is expected where an object is estimated to be located, the mapping may result in a greater modification of the received detection characteristics than if no inter-mesh defect is expected where an object is estimated to be located. In some examples the mapping is dependent on estimated dimensions of an object. As discussed above, inter-mesh defects may result from the dimensions of an object, and therefore if an inter-mesh defect is expected due to estimated dimensions of an object, the mapping may result in a greater modification of the received detection characteristics than if no inter-mesh defect is expected. In some examples, the mapping is dependent on a detection score associated with a detection of an object.

Processing the first detection output to determine the one or more modified detection characteristics includes applying, at S706, the mapping function. How the mapping function is applied depends on the type of defect that the mapping function is configured to take account of. Examples of mapping functions are described in more detail hereafter.

Figure 8:
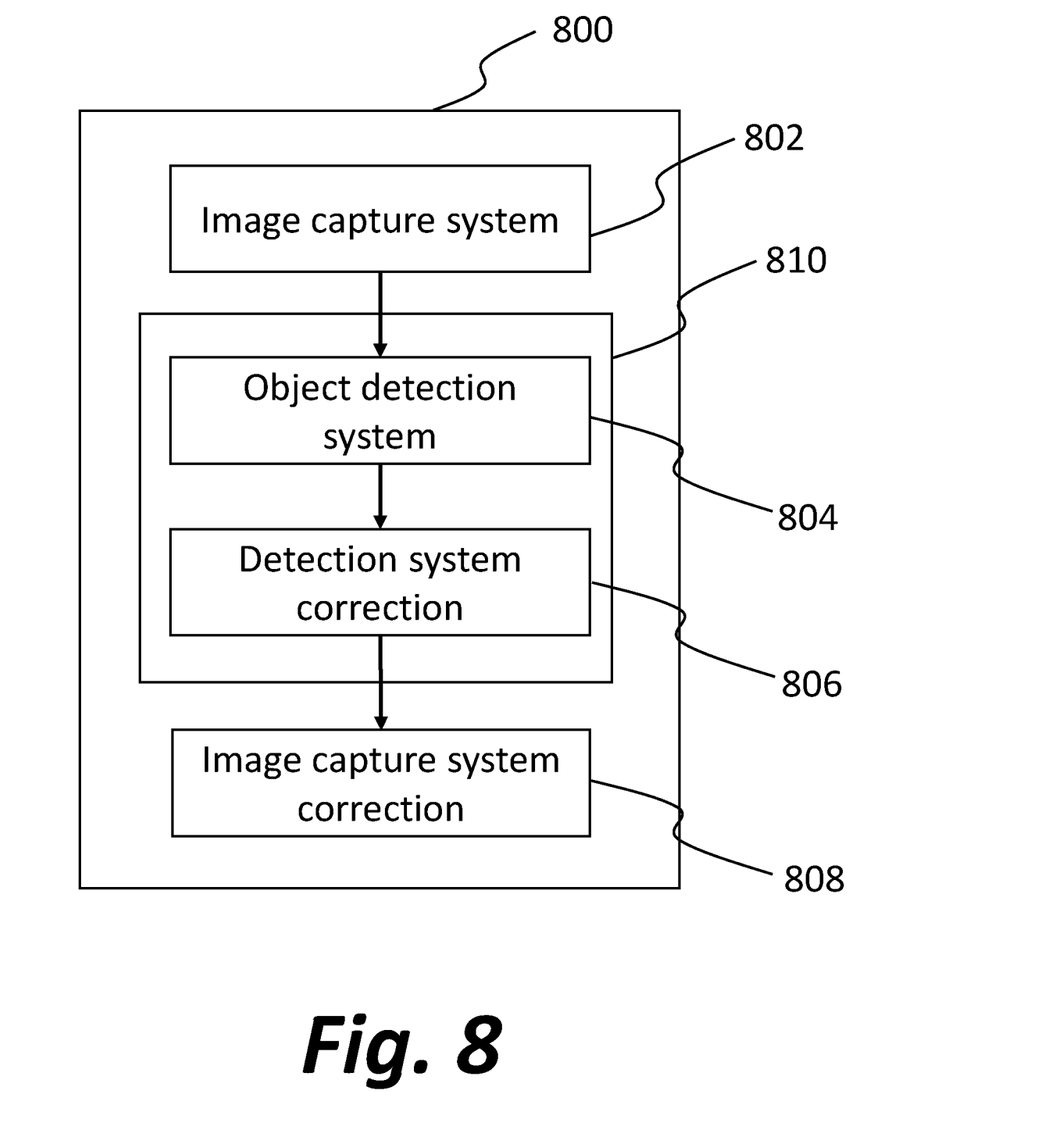
FIG. 8 shows schematically an example of a system for detecting objects in an environment.

FIG. 8 shows an example of a system 800 for detecting objects in an environment. The system 800 includes an image capture system 802 and an object detection system 804, which are substantially the same as the image capture system 502 and the object detection system 504 of FIG. 5. The system 800 also includes a detection system correction module 806 and an image capture system correction module 808. The object detection system 804 and the detection system correction module 806 in this example form a corrected object detection system 810.

The detection system correction module 806 is arranged to implement a method in accordance with the method 700 described above, to modify the output of the object detection system 804. The detection system correction module 806 is configured to compensate for degraded performance that is inherent to the object detection system 804, and is independent of the properties of the image capture system 802. In other words, the mapping applied by the detection system correction module 806 when processing object detection data output by the object detection system 804 is independent of the image capture system 802. The detection system correction module 806 may therefore be calibrated (for example, using supervised learning as described in more detail hereafter) without any knowledge of the image capture system 802. It is therefore possible for the corrected detection system 810 to be provided to a manufacturer of the device 800 (for example, a manufacturer of the image capture system 802), without need for further calibration by the manufacturer of the device 800.

The image capture system correction module 808 is arranged to further implement a method in accordance with the method 700 described above, to modify the output of the corrected object detection system 810. The image capture system correction module 808 is configured to correct for degraded performance of the corrected object detection system 810 that results from the properties of the image capture system 802. The image capture system correction module 808 therefore must be calibrated with knowledge of the image capture system 802. In this example, the entity which provides the corrected object detection system 810 further provides a calibration tool that can be used by a manufacturer of the device 800 to calibrate the image capture system correction module 808, as will be described in more detail hereafter.

In the example of FIG. 8, two separate modules sequentially modify object detection data generated by the object detection system 804. In other examples, a single module may be provided to compensate for degraded performance resulting from both the object detection system and the image capture system. This arrangement may be suitable, for example, where a manufacturer of an object detection system is also a manufacturer of an associated image capture system. In other examples, either the image capture system correction module or the detection system correction module may be omitted. For example, if a system is used to perform object detection on images, as opposed to detecting objects in an environment, an image capture system correction module is not required.

Figure 9:
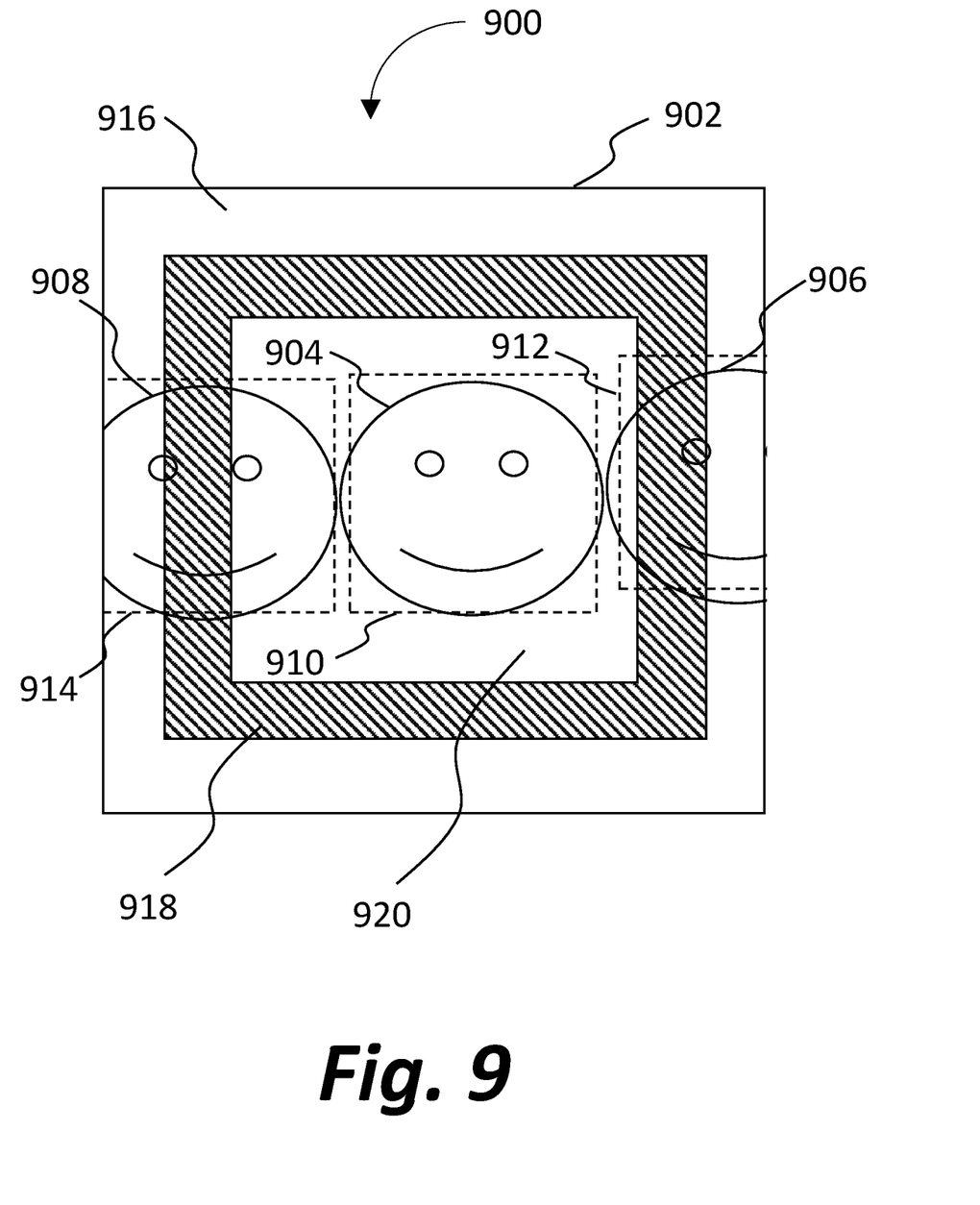
FIG. 9 shows schematically the effect of a mapping function for modifying detection characteristics generated by an object detection system.

FIG. 9 shows an example of an image 900 with a border 902. The image 900 includes a face 904, and partially includes two further faces 906 and 908. In this example, the image 900 is processed by an object detection system configured to detect faces. The object detection generates three bounding boxes 910, 912, and 914, corresponding to detections of the faces 904, 906, and 908. The faces 906 and 908 are subject to boundary defects as described above, and therefore performance of the object detection system in detecting the faces 906 and 908 may be degraded, for example resulting in reduced detection scores compared with that associated with the face 904. In order to take account of this degraded performance, the method of FIG. 7 is applied to modify the output of the object detection system.

In the example of FIG. 9, a significant portion of the face 906 extends outside of the border 902 of the image 900. In the present example, the mapping function is configured to reject any detection of an object for which it is determined, based on an estimated location and estimated dimensions of the object, that the accuracy of the detection characteristics associated with the detection of the object are expected to be reduced by more than a first threshold amount due to boundary effects. Rejecting a detection of an object may be implemented, for example, by setting a detection score associated with the detection to zero. As a result of these criteria, an object having similar dimensions to those of the face 906 will be rejected if the center of the object lies in a no confidence region 916 extending inwards from the border 902 of the image 900.

In the example of FIG. 9, a relatively small portion of the face 908 extends outside of the border 902 of the image 900. In this example, the mapping function is configured to modify a detection score of an object for which it is determined, based on an estimated location and estimated dimensions of the object, that the accuracy of the detection characteristics associated with the detection of the object are expected to be reduced by less than the first threshold mentioned above, but by more than a second, lower, threshold, due to boundary effects. A detection score may be increased or decreased, for example, by adding a given number to the detection score or by multiplying the detection score by a given factor, though in principle a mapping function can perform any suitable mathematical operation on a detection score. As a result of these criteria, a detection score associated with a detection of an object having similar dimensions to those of the face 908 will be modified if the center of the object lies in an augmented score region 918 extending inwards from the no confidence region 916. The modification of the detection score for an object within the augmented score region 918 may be dependent on the estimated location and/or dimensions of the object, as these will be indicative of the portion of the object that extends outside the border of the image. Objects that do not extend outside of the border 902 lie in an accepted score region 920. In this example, the detection characteristics associated with detections of an object in the accepted score region 920 are not modified.

In the example of FIG. 9, modifications to the detection characteristics associated with objects in the no confidence region 916 and the augmented score region 918 result from criteria set by a user of the object detection system, and are dependent on the detection characteristics. For an object with dimensions that differ from those of the faces 904, 906, and 908, a different no confidence region and a different augmented score region may result. The mapping function in this example maps an estimated location and dimensions of a detected object to an operations to be performed on the detection characteristics, for example modifying the detection score of objects or rejecting a detection of an object. The regions shown in FIG. 9 are illustrative only, and in other examples, a mapping function may be configured differently. The most appropriate configuration of a mapping function for taking account of boundary effects in an object detection system will depend on the purpose of the object detection system. For example, the criteria required for an object detection system for use in an autonomous vehicle may be different to the criteria required for an object detection system for a personal webcam. The mapping function may be implemented in a number of ways, for example by a neural network that receives detection characteristics generated by an object detection system as inputs, and determines modified detection characteristics as outputs. Parameters of the neural network, for example connection weights and biases, are determined using supervised learning as described in more detail hereafter. In another example, a mapping function may take the form of a lookup table that maps detection characteristics to modified detection characteristics. Entries of the lookup table may be learned, for example, using a decision tree.

Figure 10:
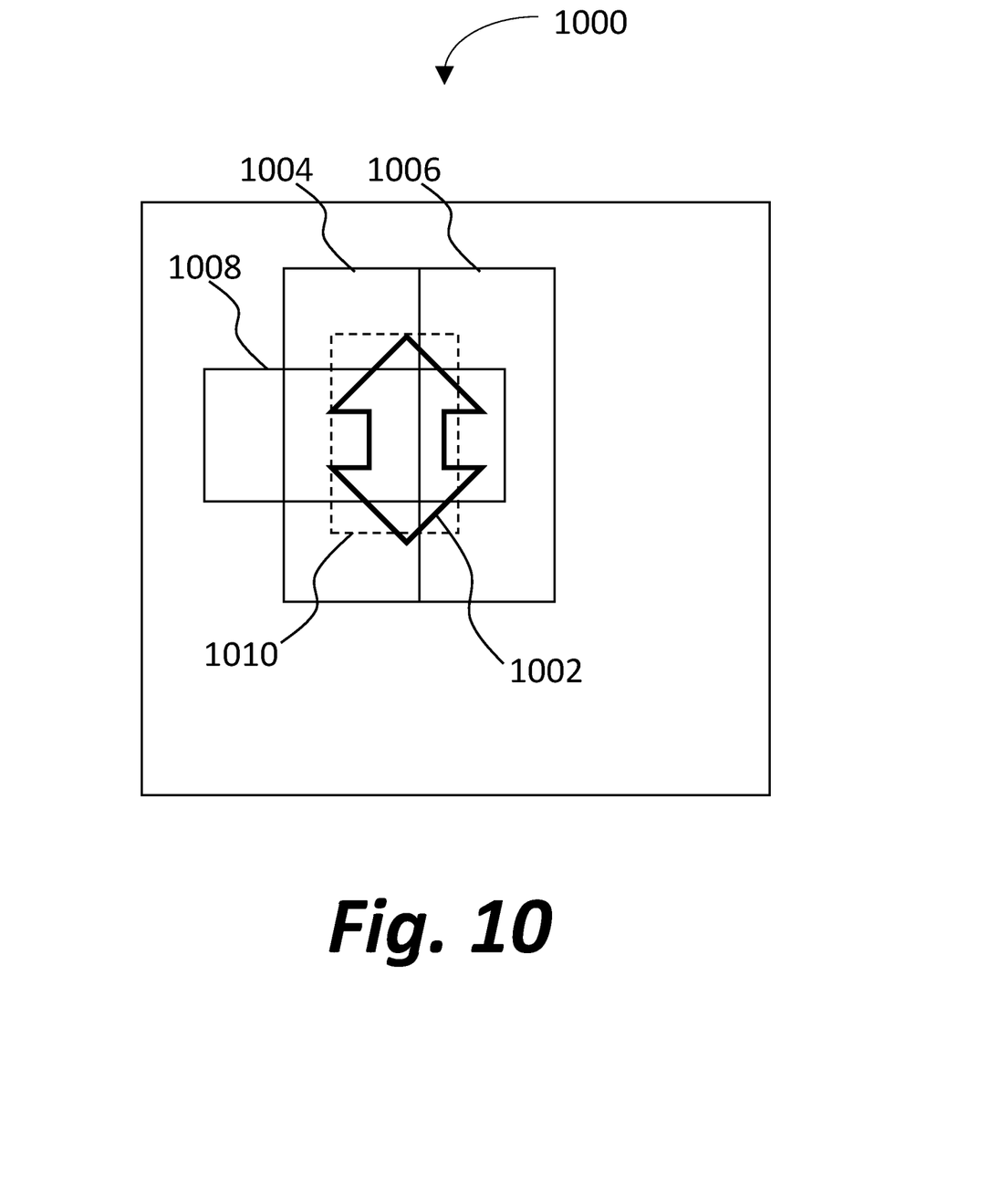
FIG. 10 shows schematically the effect of a mapping function for modifying detection characteristics generated by an object detection system.

FIG. 10 shows an example of an image 1000 containing an object 1002 (a vertical double-headed arrow). In this example, a first detection anchor 1004 generates a detection output including the location and dimensions of a bounding box 1010. The location and dimensions of the object 1002 do not correspond closely to those of the first detection anchor 1004, resulting in an inter-mesh defect that in this example manifests as a reduced detection score and inaccurate locations and dimensions of the bounding box 1010. In this example, the object 1002 is located between the first detection anchor 1004 and a second detection anchor 1006 that is adjacent to the first detection anchor 1004 (adjacent in this case meaning that no detection anchor is located between the first detection anchor 1004 and the second detection anchor 1006—it is possible that two adjacent bounding boxes are overlapping). The aspect ratio of the object 1002 is between those of the first detection anchor 1004 and a third detection anchor 1008. In other examples, a detection mesh may be multi-scale, and an object may have a size that is between those of two detection anchors at different scales. In this example, the dimensions and locations of the object 1002 most closely correspond to that of the first detection anchor 1004, resulting in the first detection anchor 1004 outputting a higher detection score that the second detection anchor 1006 and the third detection anchor 1008. Conventionally, non-maximum suppression is applied to the detection outputs generated by the object detection system. In this case, the bounding box 1010, generated by the first detection anchor 1004, would conventionally be used as the estimation of the location and dimensions of the object 1002, by virtue of having the locally highest associated detection score.

In the example of FIG. 10, detection outputs generated by the second detection anchor 1006 and the third detection anchor 1008 contain information relating to detections of the object 1002. In the present example, this information is used to compensate for the inter-mesh defect resulting from the location and dimensions of the object 1002 not closely corresponding to those of the first detection anchor 1004. In order to use this information, in this example a mapping function maps the location and dimensions of the bounding box 1010 to a weighted sum of detection characteristics from the detection outputs generated by the detection anchors 1004, 1006, and 1008. For example, a modified detection score may be generated that is a weighted sum of detection scores output by the three detection anchors 1004, 1006, and 1008. Alternatively or additionally, modified dimensions and a modified location of the bounding box 1010 may be generated that is a weighted sum of dimensions and locations of bounding boxes output by the three detection outputs 1004, 1006, and 1008. The weightings may depend on the detection characteristics generated by the first detection anchor 1004. For example, given that the first detection anchor 1004 outputs the highest detection score, and given that the location and dimensions of the object most closely correspond to those of the first detection output 1004, the weighting applied to the detection characteristics generated by the first detection output 1004 are expected to be higher than those applied to the detection characteristics generated by the second detection output 1006 and the third detection output 1008.

A mapping function configured to compensate for intermesh defects as described above may be implemented in a number of different ways. For example, a mapping function may be implemented using a neural network that receives detection characteristics generated by an object detection system as inputs, and determines modified detection characteristics as outputs. One or more layers of the neural network may have a convolutional structure, such that kernels are applied which process detection outputs generated by detection anchors with neighboring locations and/or dimensions together. Parameters of the neural network, for example connection weights, biases, and kernel weightings, are determined using supervised learning as described in more detail hereafter. In another example, a mapping function may take the form of a lookup table that maps detection characteristics to modified detection characteristics. Entries of the lookup table may be learned, for example, using a decision tree. In a further example, a mapping function may take the form of one or more piecewise-smooth functions that map a multi-dimensional input (corresponding to the received detection characteristics) to an output for each modified detection characteristic. Supervised learning may be used to determine parameters of the piecewise-smooth functions.

Figure 11:
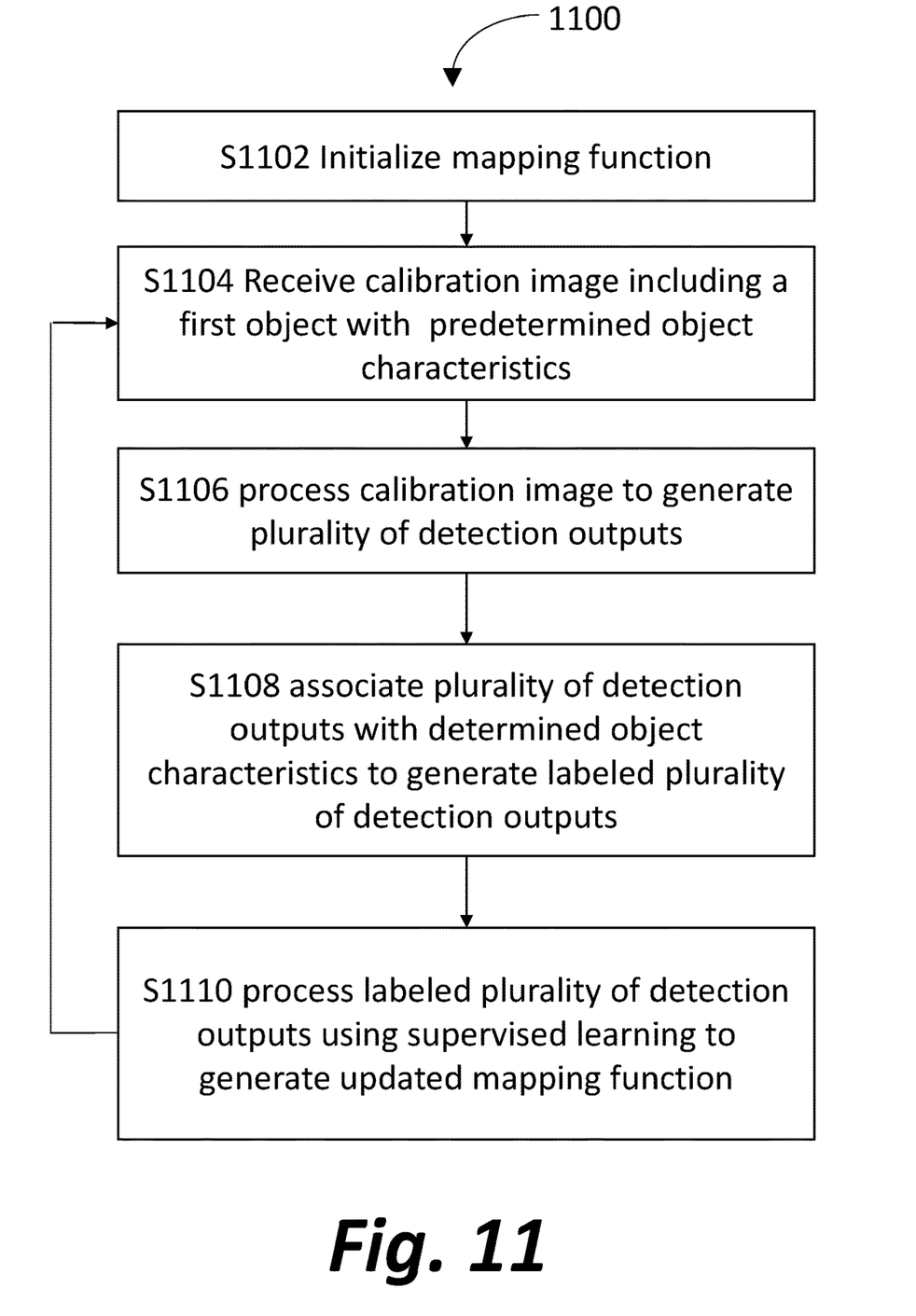
FIG. 11 is a flow diagram representing a method of calibrating a system for modifying an output of an object detection system.

FIG. 11 shows an example of a method 1100 for calibrating a system for modifying data generated by an object detection system. The method 1100 includes initializing, at S1102, a mapping function. How the mapping function is initialized will depend on the form of the mapping function, examples of which are discussed above. For example, if the mapping function is implemented using a neural network, initializing the mapping function may involve randomly initializing connection weights of the neural network. In other examples, initializing a mapping function may involve retrieving previously calibrated mapping function. This may be the case, for example, if the mapping function is to be calibrated to compensate for defects introduced by a particular image capture system. Initializing the mapping function may then include retrieving a mapping function calibrated using a similar image capture system.

The method 1100 includes receiving, at 51104, a calibration image including a first object with predetermined object characteristics. The predetermined object characteristics may include, for example, a location and dimensions of a ground truth bounding box containing the first object. The predetermined object characteristics may further include an object class to which the first object belongs. The location and dimensions of the first object in the calibration image may be such that inter-mesh defects or boundary effects are expected to affect the performance of the object detection system in detecting the first object.

The method 1100 includes processing, at 51106, the calibration image, using the object detection system, to generate a set of detection outputs each including a respective set of detection characteristics. Each of the detection outputs is associated with a detection anchor and includes a respective set of detection characteristics. For calibration purposes, in some examples, detection outputs are generated for every detection anchor of the detection mesh used by the object detection system. In other examples, detection outputs are only generated for detection anchors with locations and/or dimensions similar to the ground truth location and/or dimensions of the first object.

The method 1100 includes associating, at S1108, the generated set of detection outputs with the predetermined object characteristics of the first object. In this way, a labelled set of detection outputs is generated, in which the predetermined object characteristics play the role of a (possibly multi-dimensional) label for the generated set of detection outputs. The labeled set of detection characteristics is then processed, at S1110, using supervised learning, to update the mapping function. The mapping function is updated in such a way to reduce a loss function that represents a deviation of the detection characteristics generated by the object detection system from the predetermined object characteristics of the first object. In the case where the mapping function is implemented using a neural network, updating the mapping function includes performing backpropagation to determine a gradient of the loss function with respect to parameters of the neural network (for example, connection weights and/or biases) and performing gradient-based optimization to reduce the loss function. In cases where one or more layers of the neural network have a convolutional structure, updating the mapping function includes updating kernel weights of the convolutional layers.

In an example where the location and/or dimensions of the first object closely correspond to those of a detection anchor, and where boundary effects are not important, the detection characteristics may closely match the predetermined object characteristics (resulting in, for example, a high detection score and accurate estimated location and dimensions of a bounding box), and therefore the loss function may be small. In such examples, the mapping function may result little or no modification of the detection characteristics. By contrast, in an example where the location and/or dimensions of an object do not closely correspond to a detection anchor, or where boundary effects are important, the detection characteristics may not closely match the predetermined object characteristics. In such examples, the loss function may be relatively large, so the mapping function may result in significant modification of the predetermined object characteristics.

Steps S1104-S1110 of the method 1100 may be performed for a training set of calibration images containing objects with respective different locations and/or dimensions. The mapping function therefore learns how to compensate for defects associated with objects having different locations and/or dimensions.

The method 1100 may be used to calibrate a system to compensate for degraded performance of an object detection system that is inherent to the object detection system and is independent of an associated image capture system. The method 1100 may similarly be used to calibrate a system to compensate for degraded performance of an object detection system resulting from an associated image capture system. In this latter case, processing the calibration image at S1106 includes passing the calibration image through a model of the associated image capture system, such that the effect of the image capture system on the calibration image is simulated.

It is noted that the present method, in which the output of an object detection system is modified as a post-processing step, does not require any change to the operation of the object detection system. In particular, no retraining of the object detection system is required to compensate for defects of the types discussed above.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A computer-implemented method comprising:
   receiving, from an object detection system, object detection data comprising a plurality of detection outputs associated with different respective regions of an image, wherein a first detection output of the plurality of detection outputs is associated with a first region of the image and comprises a plurality of received detection characteristics;
   processing the first detection output to determine one or more modified detection characteristics of said plurality of received detection characteristics, by:
      retrieving a mapping function; and
      applying the mapping function, the mapping being dependent upon at least one of the plurality of received detection characteristics.

2. A method according to claim 1, wherein the plurality of received detection characteristics comprises at least one of:
   a detection score associated with a detection of an object in the image;
   an estimated location of an object relative to the first region of the image; and
   estimated dimensions of an object in the image.

3. A method according to claim 2, wherein the one or more modified detection characteristics comprise a modified estimated detection score associated with the detection of the object in the image.

4. A method according to claim 1, wherein the processing of the first detection output to determine the one or more modified detection characteristics comprises processing one or more further detection outputs, each of the further detection outputs being associated with a respective further region of the image.

5. A method according to claim 4, wherein a further region of the image associated with one of the further detection outputs is adjacent to the first region of the image.

6. A method according to claim 4, wherein a further region of the image associated with one of the further detection outputs has different dimensions to the first region of the image.

7. A method according to claim 1, wherein the plurality of received detection outputs comprises:
   an estimated location of an object relative to the first region of the image; and
   estimated dimensions of an object in the image,
wherein the processing of the first detection output comprises:
   determining, from the estimated location of the object and the estimated dimensions of the object, that a portion of the object extends outside of a border of the image; and
   rejecting the detection of the object on the basis of the determination of the portion of the object extending outside of the border of the image.

8. A method according to claim 1, wherein the plurality of received detection outputs comprises:
   a detection score associated with a detection of an object in the image;
   an estimated location of an object relative to the first region of the image; and
   estimated dimensions of an object in the image,
wherein the processing of the first detection output comprises:
   determining, from the estimated location of the object and the estimated dimensions of the object, that a portion of the object extends outside of a border of the image; and modifying the detection score on the basis of the determination of the portion of the object extending outside of the border of the image.

9. A method according to claim 1, wherein:
the object detection system generates the object detection data by processing image data received from an associated image capture system, and
the mapping is independent of the associated image capture system.

10. A method according to claim 9, comprising:
processing the one or more modified detection characteristics to determine at least one corrected modified detection characteristic, by:
retrieving a further mapping function; and
applying the further mapping function, the further mapping being dependent upon at least one of the one or more modified detection characteristics.

11. A method of calibrating a system for modifying data generated by an object detection system, the method comprising:
receiving a calibration image comprising a first object with predetermined object characteristics;
processing the calibration image, using the object detection system, to generate a plurality of detection outputs associated with different respective regions of the calibration image and each comprising a respective plurality of detection characteristics;
associating the plurality of detection outputs with the predetermined object characteristics to generate a labeled plurality of detection outputs; and
processing the labeled plurality of detection outputs using supervised learning to generate a mapping function,
wherein the mapping function is configured to process one or more received detection characteristics to determine one or more modified detection characteristics, the mapping being dependent upon at least one of the one or more received detection characteristics.

12. A method according to claim 11, wherein the predetermined object characteristics comprise at least one of:
a location of the first object within the calibration image; and
dimensions of the first object.

13. A method according to claim 11, wherein the processing of the calibration image to generate the plurality of detection outputs comprises processing the calibration image with a model of an image capture system associated with the object detection system.

14. A non-transient storage medium comprising machine readable instructions which, when executed by processing circuitry of a computer system, cause the computer system to perform a method of modifying data comprising a plurality of detection outputs associated with different respective regions of an image, wherein a first detection output of the plurality of detection outputs is associated with a first region of an image and comprises a plurality of received detection characteristics,
the method comprising processing the first detection output to determine one or more modified detection characteristics of said plurality of detection characteristics, by:
retrieving a mapping function; and
applying the mapping function, the mapping being dependent upon at least one of the plurality of received detection characteristics.

* * * * *